Jan. 23, 1923.                                                    1,443,034
R. E. OLDS.
ROOT EXTRACTOR.
FILED MAR. 5, 1920.
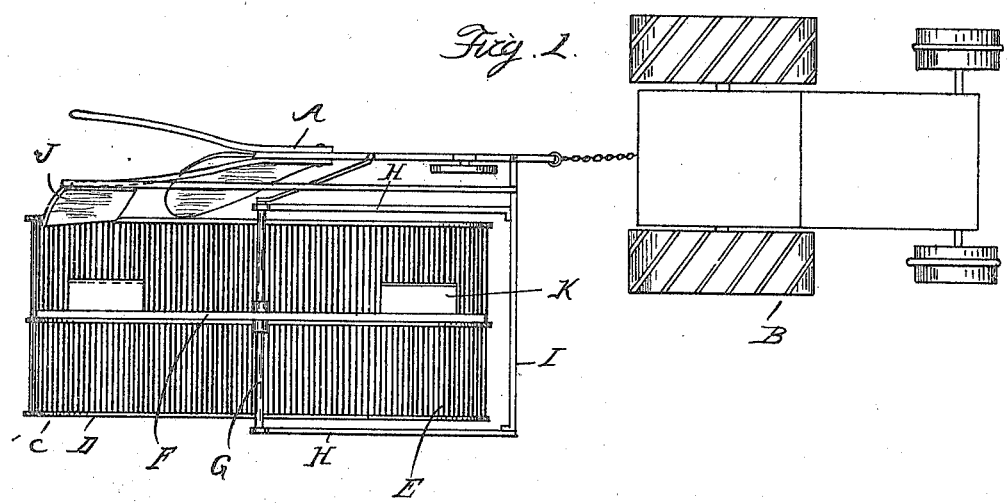
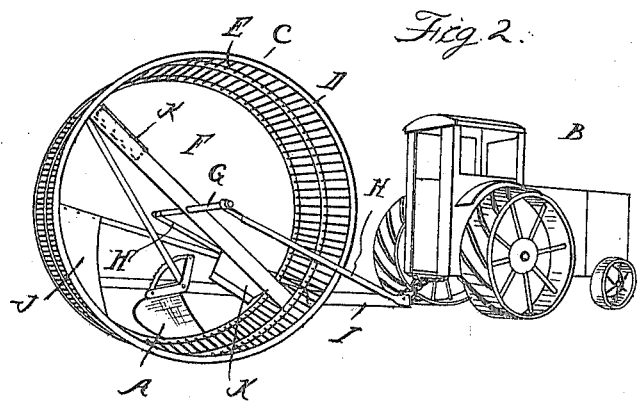
Inventor
Ransom E. Olds
By Whittemore Hulbert & Whittemore
Attorneys Patented Jan. 23, 1923.

1,443,034

UNITED STATES PATENT OFFICE.

RANSOM E. OLDS, OF LANSING, MICHIGAN.

ROOT EXTRACTOR.

Application filed March 5, 1920. Serial No. 363,529.

*To all whom it may concern:*

Be it known that I, RANSOM E. OLDS, a citizen of the United States of America, residing at Lansing, in the county of Ingham and State of Michigan, have invented certain new and useful Improvements in Root-Extractors, of which the following is a specification, reference being had therein to the accompanying drawings.

The invention relates to agricultural implements designed for removing or separating fine roots from the soil, and it is the object of the invention to extract the roots, free them from the adhering soil and to deposit them on the surface, where they may be burned or otherwise disposed of. To this end the invention consists in the construction of extractor as hereinafter set forth.

In the drawings:

Figure 1 is a plan view;

Figure 2 is a perspective view.

A is a plow of any suitable construction and which is operated by any suitable means, such as a tractor B. C is a cylindrical cage arranged to roll adjacent to the side of the plow and in a position to receive the furrow turned by said plow. This cage as shown is formed of a plurality of rings D with cross bars E extending therethrough and suitably spaced. The central ring has attached thereto the diametrically extending bar F, which at its center is provided with a laterally-extending axle G mounted therein. H are draft bars swiveled to the opposite ends of the axle G and extending forward therefrom. I is a cross bar mounted on the frame of the plow to which bar the draft bars H are pivotally attached. J is a shield mounted on the plow frame, which extends adjacent to the end of the cage C and serves to retain the furrow from dropping out of the end of the cage next to the plow.

With the construction as described, in operation, the furrow which is turned over by the plow is deposited upon the bottom of the cage and in the rolling of the cage over the ground, the earth and contained roots thus deposited will be carried backward and upward, falling over and over until all of the adhering earth is shaken off of the roots. The roots thus freed from the earth will finally drop off through the opposite end of the cage and will be left lying on the surface of the ground. After they are properly dried out, they may be raked into piles and burned, or otherwise disposed of.

To assist in freeing the roots from the soil and to feed said roots out from the outer end of the cage, the cross-bar F has inclined flanges K mounted thereon which once in each revolution cut through the material within the cage and propel it towards the other end.

What I claim as my invention is:

1. The combination with a plow having a draft rigging and a rotatable cage, of a second draft rigging for the cage secured to the plow frame and adapted to secure the cage in spaced relation to the furrow side of the plow and in rolling contact with the ground, and a shield secured to the cage interposed between the mold board of the plow and the adjacent portion of the cage.

2. The combination with a plow, the frame thereof and a draft rigging of an auxiliary draft rigging extending from the furrow side of the plow, a cage for receiving the contents of the furrow journaled on the auxiliary draft rigging in rolling contact with the ground and in spaced relation to the furrow side of the plow, means for propelling said contents out of said cage and a shield interposed between the plow and cage behind the mold board of the plow.

3. The combination with a plow and the frame thereof, of a bar extending laterally from the plow frame on the side towards which the furrow is turned, a rotary cage in rear of said bar, an axle secured centrally within said cage, draft bars engaging said axle and connected at their forward ends to said laterally extending bar, whereby said cage is rolled with the plow in fixed relation thereto, and a shield at the end of the cage by which the furrow from the plow passes.

4. The combination with a plow and the frame thereof, of a bar extending laterally from the frame at the forward end thereof, a cylindrical cage having open ends and a central axle, draft bars attached to said axle and extending forward therefrom, being attached at their forward ends to said laterally extending bar, and a non-revoluble shield mounted on the plow frame adjacent to the end of the cage by which the furrow from the plow passes.

5. The combination with a plow and the frame thereof, of a bar extending laterally from said frame, a cylindrical cage formed of rings and rods connecting the same, a bar extending diametrically across said cage, an axle mounted on said bar, draft bars connected to said axle and extending forward, being attached at their forward ends to said laterally extending bar, and a shield non-revolubly mounted on said frame adjacent to the end of the cage by which the furrow is allowed to pass.

6. The combination with a plow, of a rotary cage arranged adjacent thereto and adapted to receive the contents of the furrow, means for advancing and revolving the cage in fixed relation to the plow, and means for cutting through said contents and propelling the same out of said cage.

In testimony whereof I affix my signature.

RANSOM E. OLDS.